United States Patent [19]

Suyama

[11] Patent Number: 4,852,012

[45] Date of Patent: Jul. 25, 1989

[54] DIRECTION FINDER FOR VEHICLE

[75] Inventor: Mitiyo Suyama, Hyogo, Japan

[73] Assignee: Mitsubishi Denki Kabushiki Kaisha, Tokyo, Japan

[21] Appl. No.: 105,788

[22] Filed: Oct. 8, 1987

[30] Foreign Application Priority Data

Oct. 8, 1986 [JP] Japan .................................. 61-240688

[51] Int. Cl.⁴ ............................................. G01C 17/38
[52] U.S. Cl. ..................... 364/449; 364/457; 364/571.02; 33/356
[58] Field of Search .................. 364/449, 457, 571.02; 33/361, 355 R, 356, 357; 324/244

[56] References Cited

U.S. PATENT DOCUMENTS

| | | | |
|---|---|---|---|
| 4,414,753 | 11/1983 | Moulin et al. | 33/357 |
| 4,416,067 | 11/1983 | Scherer et al. | 33/357 |
| 4,546,550 | 10/1985 | Marchent et al. | 33/356 |
| 4,672,565 | 6/1987 | Kuno et al. | 33/356 |
| 4,729,172 | 3/1988 | Alberter et al. | 33/356 |
| 4,733,179 | 3/1988 | Bauer et al. | 33/356 |
| 4,738,031 | 4/1988 | Alberter et al. | 33/356 |

Primary Examiner—Gary Chin
Attorney, Agent, or Firm—Sughrue, Mion, Zinn, Macpeak & Seas

[57] ABSTRACT

A direction finder is disclosed, which comprises a locus amending means which operates such that, when corrected detection signal pairs obtained by correcting detection signal pairs after an initial correction on the basis of coordinates value of a center of an ellipsoidal locus and radii thereof in x and y directions are not on a circle in a perpendicular coordinates system corresponding to the ellipsoidal locus, distances from the circle to the coordinates of the corrected detection signal pairs are divided into perpendicular coordinates components as vector component pair and the center coordinates of the ellipsoidal locus and radii thereof are amended and updated on the basis of the vector component pairs and radii, the magnetism detection signal being amended with using these amending values.

2 Claims, 7 Drawing Sheets

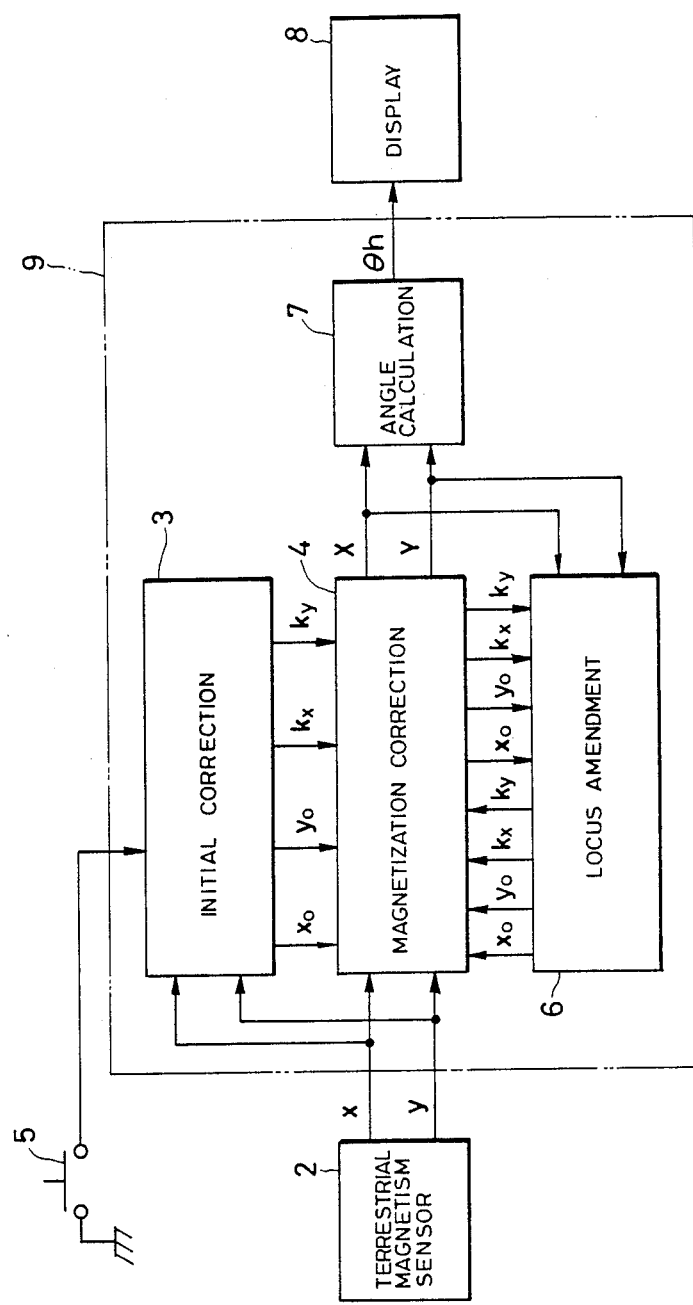

DIRECTION FINDER FOR VEHICLE

BACKGROUND OF THE INVENTION

The present invention relates to a direction finder for a vehicle, in which a moving direction is detected by detecting terrestrial magnetism.

FIGS. 1 and 2 will be used to describe the principle of a direction finding operation of a conventional direction finder for use in a vehicle. A horizontal component H (hereinafter referred to as "terrestrial magnetism H") of terrestrial magnetism is detected by a terrestrial magnetism detector 2 mounted on a vehicle 1 as shown in FIG. 1. Assuming that a moving direction A of the vehicle 1 makes an angle $\theta$ with respect to a direction of the geographic magnetism H, i.e., north, the terrestrial magnetism detector 2 detects a component $H_y$ ($=H \cos \theta$) of the terrestrial magnetism H in the same direction as the vehicle moving direction, and a component $H_x$ ($=H \sin \theta$) orthogonal to the moving direction A. These components are converted by the terrestrial magnetism detector 2 into electric signals, respectively, which are then amplified to provide a pair of detection signals x and y according to the following equations $$x = KH_x = KH \sin \theta \tag{1a}$$

$$y = KH_y = KH \cos \theta \tag{1b}$$

where K is a magnetism-to-voltage conversion constant. The signals x and y may be d.c. voltages. As evident from the equations 1a and 1b, to provide detector calibrator the detected signals x and y should be suitably calibrated to zero when the field components $H_x$ and $H_y$ are zero so that the magnitudes of the signals x and y are proportion to intensities of the components $H_x$ and $H_y$, respectively, and can be used as reference values.

FIG. 2 is an x-y perpendicular coordinate system on which points, each being defined by magnitudes of the electric signals x and y, are plotted. A locus of the plot describes a circle $O_1$ and an angle $\theta$, i.e., the orientation of the vehicle 1 is given by an equation:

$$\theta = \tan^{-1}(x/y) \tag{2}$$

Due to limitations in an initial calibration operation and due to slight errors often induced by in avoidable errors inherent in an operation of a detector (e.g., error per distance or area traveled), in reality there exists a potential that the direction of the terrestrial magnetism H is not coincident with the geographical north and there is an error, i.e., declination therebetween. For simplicity and ease of discussion it is assumed here that there is no such error.

As another source of error, it has been known that, due to magnetization of magnetic material of various components constituting the vehicle, an orientation $\theta$ calculated according to the equation (2) is not always correct.

Describing this in more detail with reference to FIGS. 3 and 4, the vehicle 1 is subjected to a magnetic field $H_v$ shown in FIG. 3 produced by those magnetized components. With the magnetic field $H_v$, the magnetic field to be detected by the terrestrial magnetism sensor 2 becomes a magnetic field $H_e$ which is a composite of the terrestrial magnetism H and the magnetic field $H_v$. Coordinates (x,y), ($x_v$, $y_v$) and ($x_e$, $y_e$) of signals from the sensor 2 which correspond to coordinates ($H_x$,$H_y$), ($H_{vx}$,$H_{vy}$) and ($H_{ex}$,$H_{ey}$) are shown in FIG. 4. Thus, the signal $x_e$ and $y_e$ from the sensor 2 are represented by $$x_e = x + x_v = K_1 H \sin \theta + x_v \tag{3a}$$

$$y_e = y + y_v = K_2 H \cos \theta + y_v \tag{3b}$$

where the angle $\theta_e$ obtained from the signals $x_e$ and $y_e$ according to the equation (2) becomes $$\theta_e = \tan^{-1}(x_e/y_e) \tag{4}$$

Thus, a true orientation $\theta$ can not be obtained.

However, since the field $H_v$ is produced by the vehicle 1 acting as a permanent magnet and an intensity and direction thereof with respect to the moving direction A of the vehicle 1 are constant, the coordinates ($x_v$, $y_v$) of the signal corresponding to the magnetic field $H_v$ shown in FIG. 4 is kept unchanged even if the direction A is changed. Therefore, a locus of the coordinates ($x_e$,$y_e$) of a detection signal when the vehicle 1 travels along a circle route becomes an ellipse $O_3$ having a center ($x_v$, $y_v$) and an eccentricity $K_2/K_1$ as is clear from the equations (3a) and (3b). Therefore, by obtaining data concerning the center coordinates ($x_v$,$y_v$) and an eccentricity $K_2/K_1$ of the ellipse $O_3$ from the detection signals $x_e$ and $y_e$, preliminarily, a true moving direction $\theta$ can be easily obtained according to the following equation:

$$\theta = \tan^{-1}(((x_e - x_v)/(y_e - y_v)) \cdot (K_2/K_1)) \tag{5}$$

Japanese Patent Application Laid-open No. 24811/1983 discloses a typical example of a direction finder based on this principle. In this laid-open application, among the detection signals x and y obtained from the terrestrial magnetism sensor 2 when the vehicle 1 travels a circle route, maximum values $x_{max}$ and $y_{max}$ and minimum values $x_{min}$ and $y_{min}$ in the respective axes of the x-y perpendicular coordinates system are stored and the center coordinates ($x_o$,$y_o$) and x and y radii $K_x$ and $K_y$ of the ellipse $O_3$ are obtained according to the following equations:

$$x_o = (x_{max} + x_{min})/2 \tag{6a}$$

$$y_o = (y_{max} + y_{min})/2 \tag{6b}$$

$$K_x = (x_{max} - x_{min})/2 \tag{6c}$$

$$K_y = (y_{max} - y_{min})/2 \tag{6d}$$

Therefore, be performing the above operations at a suitable time and making $K_2/K_1$ correspond to $k_y/K_x$ and $x_v$ and $y_v$ to $x_o$ and $y_o$, respectively, a true moving direction can be obtained according to the equation (5).

In the conventional direction finder, the ellipse locus is estimated by using the maximum values and minimum values of the respective detection signals obtained by an initial round movement of the vehicle as initial correction values and the moving direction of the vehicle is obtained by direction signals detected thereafter on the basis of the ellipse locus, as mentioned above. Therefore, a true moving direction can be obtained as long as the estimation conditions of the ellipse locus obtained by the initial correction do not change thereafter. However, since a magnetizing field $H_v$ of the vehicle may be changed due to vibrations within the vehicle and/or a variation of external magnetic field strength, thus resulting in errors in the initial estimation condition of the ellipse locus, it is usually difficult to obtain a true moving direction. This may be overcome by directing the vehicle around a circle route again each time an estimation condition is changed. However, as a practical matter it is very troublesome for an operator of a vehicle to perform such an operation every time such a change occurs.

SUMMARY OF THE INVENTION

An object of the present invention is to provide a direction finder for a mobile body which is capable of reducing an effect of detection error in respective detection signal pairs by using the detection signal pairs after the initial correction to correct the initially estimated ellipsoidal locus successively.

According to the present invention, a direction finder comprises a locus amending means which operates such that, when corrected detection signal pairs obtained by correcting detection signal pairs after an initial correction on the basis of coordinates value of a center of an ellipsoidal locus and radii thereof in the respective axes are not on a circle in a perpendicular coordinates system corresponding to the ellipsoidal locus, distances from the circle to the coordinates of the corrected detection signal pairs are divided into perpendicular coordinates components as vector component pairs and the center coordinates of the ellipsoidal locus and the radii thereof are amended and updated on the basis of the vector component pairs and the radii of the ellipsoidal locus, the magnetism detection signals being amended using these amending values.

That is, when an intensity of a magnetizing field associated with the vehicle is changed, the values of the center coordinates of the ellipsoidal locus and the radii thereof which are used in a preceding direction finding are also changed and the corrected detection signal pairs become out of the circle. According to the present invention, in the locus amending means, the preceding center coordinates and the preceding radii of the ellipsoidal locus are amended by using the vector component pairs and the preceding radii to provide cennter coordinates and radii of the ellipsoidal locus as current locus corresponding to a current variation of the magnetizing field, and, on the basis of the amended values from the locus amending means, the magnetic field detection signals are corrected to obtain a pair of corrected detection signals, so that a true moving direction of the vehicle is detected exactly by the pair of corrected detection signals which include only the terrestrial magnetism components.

BRIEF DESCRIPTION OF THE DRAWING

FIG. 5 is a block circuit diagram of an embodiment of the present invention;

FIG. 9a is transformed into a x-y coordinate system.

DETAILED DESCRIPTION OF THE PREFERRED EMBODIMENT

Figure 2:
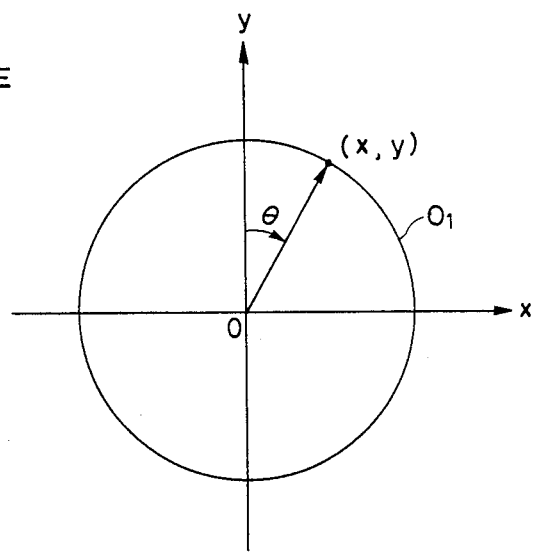
Figure 3:
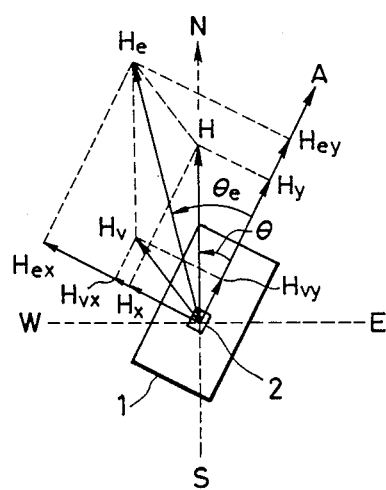
FIGS. 3 and 4 show a conventional direction finding principle when an interferring magnetizing field exists.
Figure 4:
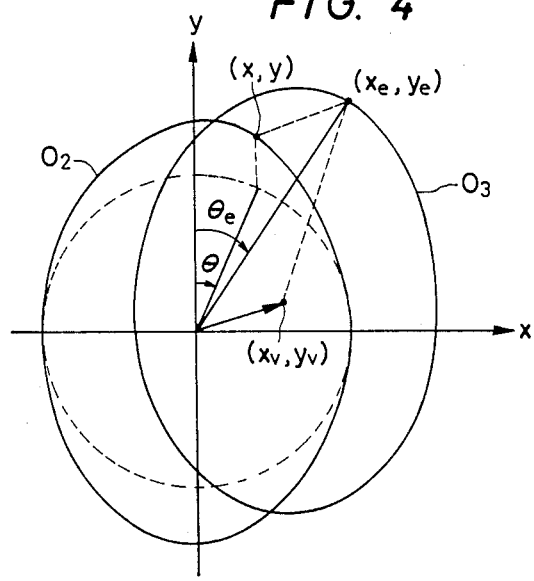

In FIG. 5, a reference numeral 2 depicts a terrestrial magnetism sensor which is identical to the sensor 2 in FIG. 2. An initial correction means 3 is similar to that of the prior art shown in the aforementioned Japanese Patent Application Laid-open No. 24811/1983 and is actuated by an operation of a switch 5 to store detection signals x and y obtained by moving a vehicle 1 through a circular route and to estimate an ellipsoidal locus by obtaining a center coordinate $(x_o, y_o)$ of the ellipse and radii $K_x$ and $K_y$ thereof in an x and y directions, respectively, according to the equations (6a) and (6b) mentioned previously. A magnetization correction means 4 for correcting the detection signals x and y from the terrestrial magnetism detection means 2 on the basis of the ellipsoidal locus according to the following equations:

$$X = (x - x_o)/K_x \tag{7a}$$

$$Y = (y - y_o)/K_y \tag{7b}$$

and providing a pair of corrected detection signals X and Y. A reference numeral 6 depicts a locus amending means responsive to the corrected detection signals X and Y from the magnetization correction means 4 to amend the ellipsoidal locus suitably.

Figure 6A:
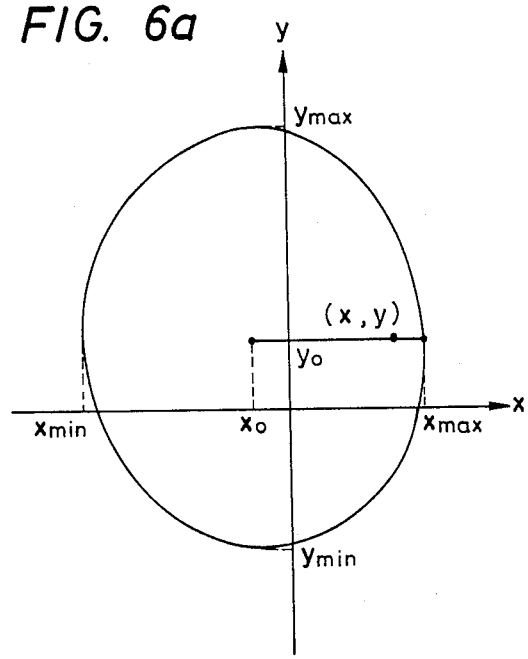
FIGS. 6a and 6b illustrate an operation of a locus amending means in FIG. 5.
Figure 6B:
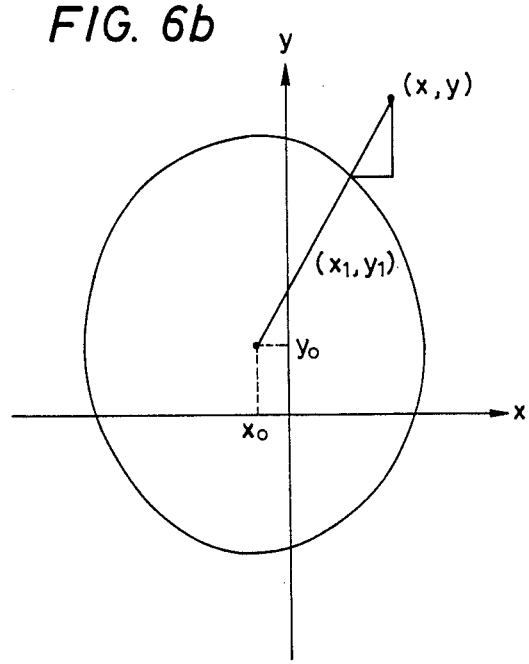

The principle of operation of the locus amending means 6 will be described. In a case where, as shown in FIG. 6a, an x coordinate of the detection signal is coincident with neither a maximum x component $x_{max}$ nor a minimum x component $x_{min}$ while a y coordinate thereof is coincident with a y coordinate of the center of the ellipsoidal locus, there may be an error in the maximum x component $x_{max}$ since, in this case, the x coordinate of the detection signal is closer to the maximum x component $x_{max}$ rather than the minimum x component $x_{min}$. In addition, there may be possibly an error in the detection signal itself. Under consideration of these errors, it may be possible to reduce the error of the maximum x component $x_{max}$ by amending the maximum x component $x_{max}$ repeatingly according to the following equation $$x_{max} \leftarrow x_{max} + Z(x - x_{max}) \tag{8}$$

provided that a predetermined weighing coefficient Z $(0 < Z < 1)$ is selected suitably. However, it is practically rare that either of the coordinates x and y of the detection signal is coincident with the center of the ellipsoidal locus. Therefore, it is practical to use one $(x_1, y_1)$ of cross points between the ellipsodial locus and a straight line passing through the center coordinates $(x_o, y_o)$ of the locus, which is closer to the coordinates (x, y) of the detection signal as a reference point. The maximum x component $x_{max}$ or the minimum x component $x_{min}$ and the maximum y component $y_{max}$ or the minimum y component $y_{min}$ are amended on the basis of respective coordinate components of vectors connecting the reference point $(x_1, y_1)$ and the detection signal coordinates (x,y). In the case shown in FIG. 6b, for example, the x coordinate of the detection signal is closer to the maximum x component $x_{max}$ rather than the minimum x component $x_{min}$ and the y coordinate thereof is closer to the maximum y component $y_{max}$ rather than the minimum y component $y_{min}$. Therefore, the maximum values $x_{max}$ and $y_{max}$ are amended according to the following equations $$x_{max} \leftarrow x_{max} + Z(x - x_1) \tag{9a}$$

$$y_{max} \leftarrow y_{max} + Z(y - y_1) \tag{9b}$$

and, together therewith, the equations (6a) and (6b) mentioned previously are executed to thereby amend the ellipsoidal locus.

In FIG. 5, a reference numeral 7 depicts an angle operation means responsive to the corrected detection signals X and Y from the magnetization amending means 3 to operate a moving direction $\theta h$ according to the following equation $$\theta h = \tan^{-1}(X/Y) \tag{9c}$$

and output a signal corresponding thereto and a display means 8 for displaying the latter signal from the angle operation means 7.

Figure 7:
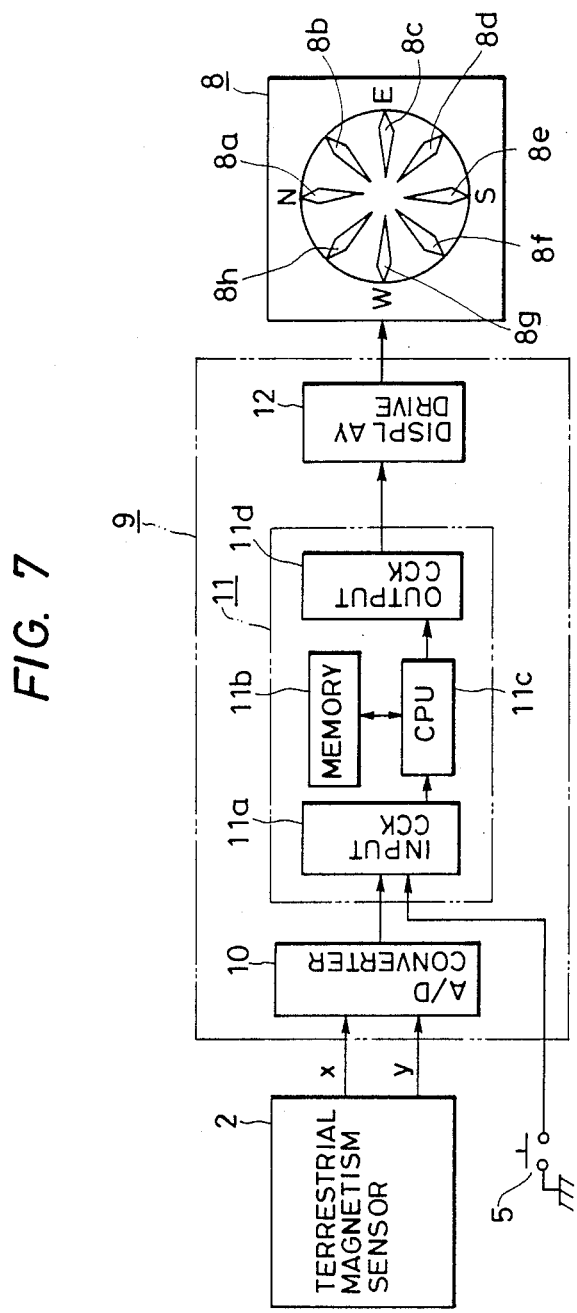
FIG. 7 is a block diagram showing a micro-computer function for realizing the respective components in FIG. 5

In FIG. 7 which shows the construction in FIG. 5 in greater detail, a control circuit 9 corresponds to a combination of the initial correction means 3, the magnetization correction means 4, the ellipsoidal locus amending means 6 and the angle opertion means 7 and comprises an analog-digital (A/D) converter 10 for converting analog detection signals x and y from the terrestrial magnetism detecting means 2 into digital values, a micro-computer 11 responsive to an output of the A/D converter 10 and a signal from the switch 5 to execute operations corresponding to the respective means and a display drive circuit 12 responsive to an output of the micro-computer 11 to drive the display means 8 accordingly. The micro computer 11 includes an input circuit 11a, a memory 11b, a central processing unit (CPU) 11c and an output circuit.

The display means 8 comprises a liquid crystal display panel which is divided into display segments 8a to 8h for displaying a moving direction $\theta h$ by actuating one of the segments 8a to 8h according to the signal from the display drive circuit 12. It should be noted that the device shown in FIG. 7 is mounted on the vehicle 1 and a program for operating the CPU 11c according to the flow chart shown in FIG. 8 is stored in the memory 11b preliminarily.

In operation, the terrestrial magnetism detecting means 2, the control circuit 9 and the display means 8 are actuated when a power switch (not shown) is turned on. That is, the terrestrial magnetism sensor 2 detects the terrestrial magnetism H and provides detection signals x and y which are supplied through the A/D converter 10 to the micro-computer 11. The latter is also actuated upon the turning on of the power switch and operates from an initial step 101 sequentially along a main routine shown in FIG. 8a. Describing an operation of the initial correction means 3 firstly, when the switch 5 is operated by an operator and the fact is confirmed as shown in the step 101, an initial correction routine is performed as shown in a step 102. In the initial correction routine, the same operation is conducted as that disclosed in the aforementioned Laid-open No. 24811/1983, so that respective values $x_o$ and $y_o$ of the center coordinates of the ellipsoidal locus and radii $K_x$ and $K_y$ thereof in x and y directions are obtained, respectively.

The magnetization correction means 4 receives the detection signals x and y as shown by a step 103 and obtains the corrected detection signals X and Y according to the equations (7a) and (7b) as shown by a step 104. Then, the angle operation means 7 provides the moving direction $\theta h$ on the basis of the equation (9c) as shown by a step 105 and supplies it to the display drive circuit 12 as shown by a step 106. The display drive circuit 12 responds to the direction signal $\theta h$ to actuate corresponding one of the display segments 8a to 8h to therey display the moving direction $\theta h$. Thereafter, during a time period in which the vehicle 1 does not move by predetermined distance d, the operation is returned to the step 101 as shown by a step 107 and the same operation is repeated. The decision of whether or not the vehicle 1 moved by the distance d can be performed by supplying the signal from the distance sensor of the vehicle to the micro-computer 11 in which the decision is made.

Figure 1:
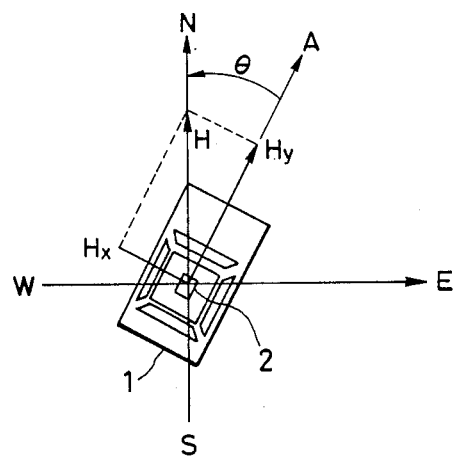
FIGS. 1 and 2 show principles of conventional direction finding according to only terrestrial magnetism, respectively.

When the vehicle moves by a predetermined distance d during the operation of the magnetization correction means 4, the correction amount amending means 6 performs an ellipsoidal locus amending routine as shown by a step 108. The routine will be described with reference to FIGS. 8b and 1. In order to facilitate the calculation of the vector components $\Delta x$ and $\Delta y$ connecting the coordinates of the detection signal and one of the cross points between the ellipsoidal locus and the straight line passing the center of the ellipse which is closer to the coordinates of the detection signal than the other, the coordinate system of the correction signal pair shown in FIG. 1b which is converted from the coordinate system of the detection signal pair shown in FIG. 1a according to the equations (7a) and (7b) is considered. That is, as shown by a step 201, respective components $\Delta X$ and $\Delta Y$ of those obtained by converting the vectors into the coordinate system of the correction signal pair are obtained according to the following equations.

$$\Delta X = X - X/(X^2 + Y^2)^{\frac{1}{2}} \tag{10a}$$

$$\Delta Y = Y - Y/(X^2 + Y^2)^{\frac{1}{2}} \tag{10b}$$

Since the reverse conversion of the equations (7a) and (7b) are $$x = K_x \cdot X + x_o \tag{11a}$$

$$y = K_y \cdot Y + y_o \tag{11b}$$

the respective components $\Delta x$ and $\Delta y$ of the vectors are obtained by the following equations as shown by a step 202

$$\Delta x = K_x \cdot \Delta X \tag{12a}$$

$$\Delta y = K_y \cdot \Delta Y \tag{12b}$$

Then, the maximum x component $x_{max}$ or the minimum x component $x_{min}$ are amended by using the vector component x. In order to do so, it has to be decided which of the maximum x component $x_{max}$ or the minimum x component $x_{min}$ is closer to the x coordinates of the detection signal. Since, according to the equations (6a), (6b), (7a) and (7b) and a condition $$x_{max} > x_{min}$$

the following equations are established, $$|x-x_{max}| > |x-x_{min}| \longrightarrow X > 0 \tag{13a}$$

$$|x-x_{max}| = |x-x_{min}| \longrightarrow X = 0 \tag{13b}$$

$$|x-x_{max}| > |x-x_{min}| \longrightarrow X < 0 \tag{13c}$$

a sign correction detection signal X based on the x component detection signal x is decided as shown by a step 203. If $X > 0$, the maximum x component $x_{max}$ is amended by using the following equation using the vector component $\Delta x$ obtained by using the predetermined weighing coefficient Z and the equations (6a) and (6b)

$$x_{max} \leftarrow x_{max} + Z \cdot \Delta x \tag{14}$$

Executing the equations (6a) and (6b), the followings are obtained as shown by a step 204

$$x_o \leftarrow x_o + Z \cdot \Delta x/2 \tag{14a}$$

$$K_x \leftarrow K_x + Z \cdot \Delta x/2 \tag{14b}$$

thus, new center coordinate $x_o$ and a new radius $K_x$ in the x direction are obtained.

When $X < 0$, the minimum x component $x_{min}$ is amended according to the following equation $$x_{min} \leftarrow x_{min} + Z \cdot \Delta x \tag{15}$$

Executing the equations (6a) and (6b) therealong, $$x_o \leftarrow x_o + Z \cdot \Delta x/2 \tag{15a}$$

$$K_x \leftarrow K_x - Z \cdot \Delta x/2 \tag{15b}$$

are obtained and thus a new center coordinate $x_o$ and a new radius $K_x$ in the x direction are obtained as shown by a step 205. In the case of $X=0$, both the maximum x component $x_{max}$ and the minimum x component $x_{min}$ are not amended.

Figure 8A:
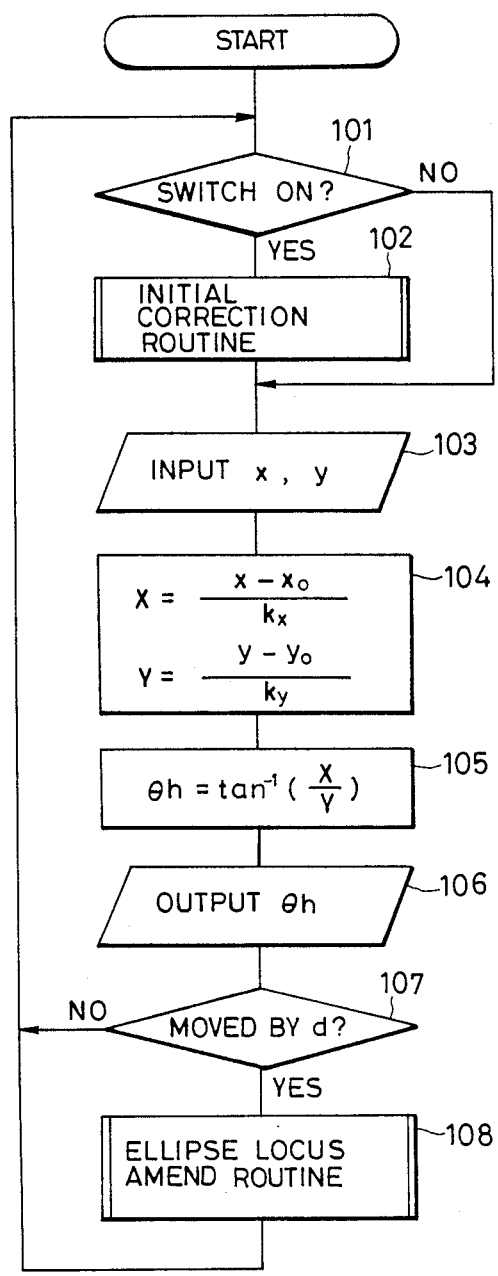
FIGS. 8a and 8b are flow charts showing an operation of the micro-computer in FIG. 7
Figure 8B:
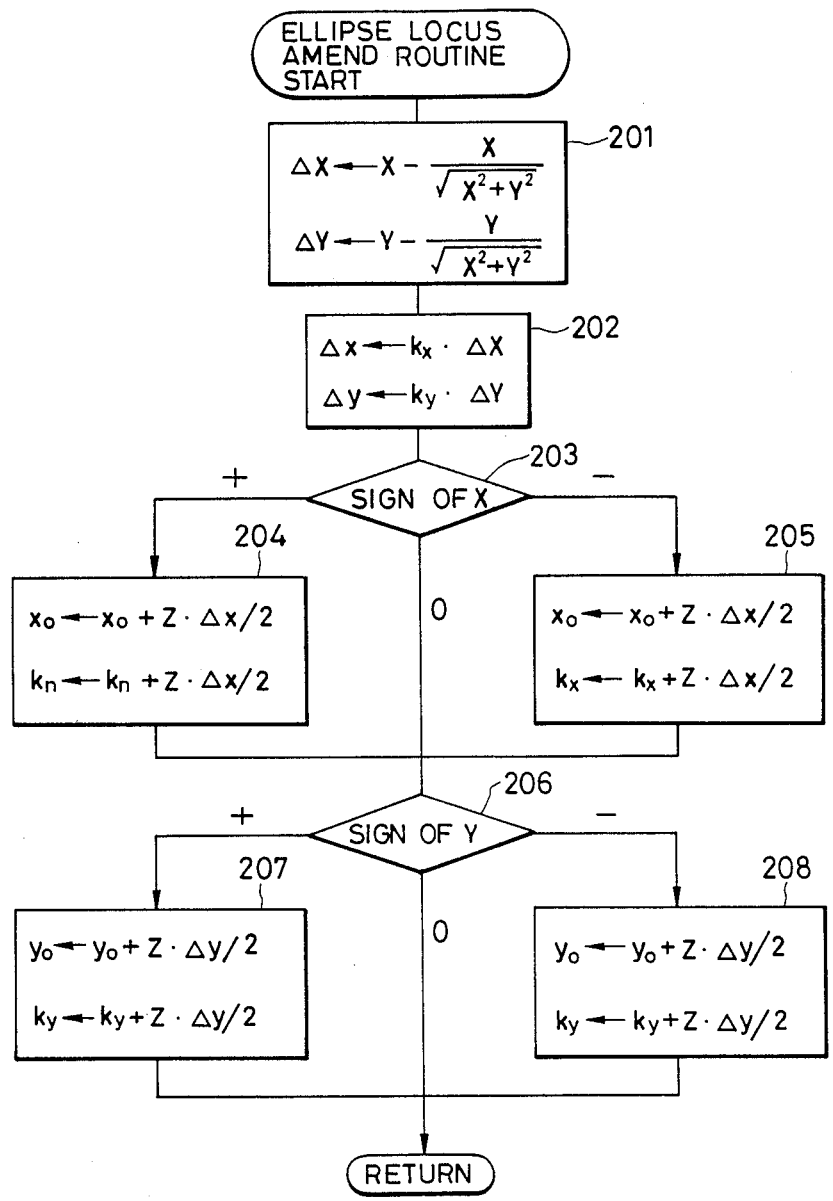
Figure 9A:
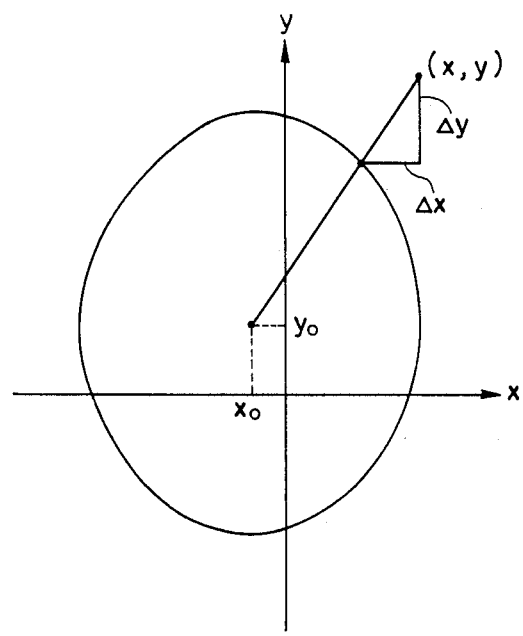
FIG. 9a shows a positional relation of an ellipsoidal locus to detection signals in a x-y coordinate system.
Figure 9B:
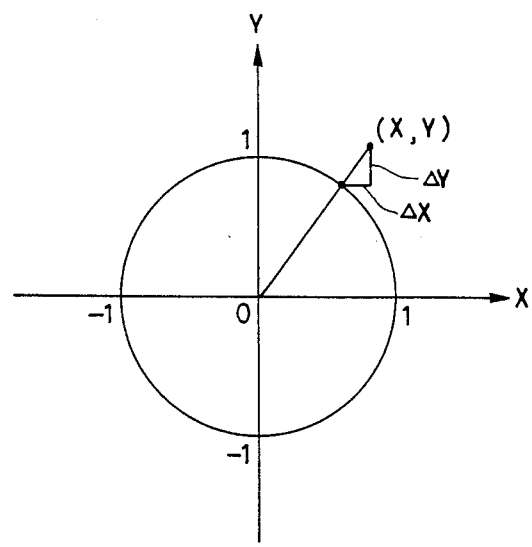
FIG. 9b shows a position relation of a circular locus to corrected detection signals when

Finally, as shown by steps 206 to 208, the maximum y component $y_{max}$ or the minimum y component $y_{min}$ are amended by using the y components $\Delta y$ of the vectors as in the same manner as those shown by the steps 203 to 205 to obtain a new center coordinate $y_o$ and a new radius $K_y$ in the y direction, thus completing the amendment of the ellipsoidal locus, and the operation is returned to the main routine shown in FIG. 8a. When the switch 5 is not turned on after the operation is returned to the main routine, the step 204 is jumped and the same operation as mentioned above is performed.

Therefore, by repeating the above mentioned locus amending routine with a movement of the vehicle, the locus is estimated by a large number of detection signals. Therefore, by selecting a weighing coefficient Z suitably, errors of the respective detection signals are cancelled with each other, resulting in a reduced effect of error and more exact estimation of the ellipsoidal locus.

In the described embodiment, the ellipsoidal locus amendment routine is executed every time the vehicle moves by a constant distance as shown by the step 107.

It may be possible to execute the amending routine upon each occurrence of a constant time period. Further, although in the described embodiment, the weighing coefficient Z is constant, it may be possible to make the coefficient a function of the number of times of executions of the ellipsoidal locus amendments after the initial correction or of a moving direction of the vehicle.

In the described embodiment, the ellipsoidal locus amendment is performed by using a sole detection signal pair x and y. It may be possible to amend by using an average of n pairs of the correction detection signals provided that coordinates of n pairs of the detection signals are concentrated within a limited and small area.

As mentioned hereinbefore, according to the present invention, the ellipsoidal locus provided at the initial correction is successively amended by using detection signal pairs so that the effect of the magnetization field of the moving body is completely removed from the detection signal pairs. Therefore, even if the magnetization field changes over time and the ellipsoidal locus changes accordingly, it is possible to amend center coordinates and a radii in the respective directions of the locus successively. Thus it is possible to completely remove detection signal components due to the magnetization field from the detected signal pairs by using these conditions, resulting in an exact detection signal necessary to obtain a true moving direction and thus an exact detection of a moving direction of the vehicle.

What is claimed is:

1. A direction finder for a movable body comprising:
    terrestrial magnetism detection means being magnetizable and mountable on a movable body, said terrestrial magnetism detection means for detecting terrestrial surface magnetism as a pair of components being parallel to a terrestrial surface and orthogonal to each other and providing a pair of detection signals corresponding thereto, respectively;
    initial correction means for obtaining, through use of detection signals obtained from said terrestrial magnetism detection means as said movable body is moved along a circular route, a center coordinate of an ellipsoidal locus and radii in respective orthogonal directions in a perpendicular coordinate system, an ellipsoid associated with said ellipsoidal locus and radii including coordinate points corresponding to respective maximum values and minimum values of said detection signals;
    magnetization correction means for correcting each further detected pair of detection signals from said terrestrial magnesism detection means on a basis of said center coordinates and radii of said ellipsoidal locus for removing detection signal components which are due to a magnetization field of said movable body to provide a pair of corrected detection signals; and
    locus amending means for obtaining, every time one of: (a.) said movable body moves to exceed a predetermined distance, and (b.) every occurrence of a predetermined time, a pair of components of a vector having said pair of corrected detection signals as a coordinate point thereon, said vector being obtained and extending from one of cross points between a straight line connecting said coordinate point corresponding to said pair of corrected detection signals and a center coordinate corresponding to said ellipsoidal locus and performing a predetermined operation on a basis of said pair of corrected detection signals and amending and updating the value of the center coordinate of the ellipsoidal locus and the values of the radii thereof on the basis of the pair of said vector components and radii of the ellipsoidal locus obtained by said initial correction means.

2. The direction finder as claimed in claim 1, wherein said locus amending means utilizes a weighing coefficient to be multiplied with the pair of the vector components in amending said center coordinate value and radii of said ellipsoidal locus.

* * * * *